(12) United States Patent
Bellosguardo

(10) Patent No.: US 7,222,097 B2
(45) Date of Patent: May 22, 2007

(54) ANONYMOUS CREDIT CARD

(76) Inventor: Philippe A. Bellosguardo, 990 Avenue of the Americas, Apartment 25H, New York, NY (US) 10018

(*) Notice: Subject to any disclaimer, the term of this patent is extended or adjusted under 35 U.S.C. 154(b) by 1371 days.

(21) Appl. No.: 09/758,293

(22) Filed: Jan. 11, 2001

(65) Prior Publication Data

US 2001/0049655 A1    Dec. 6, 2001

Related U.S. Application Data

(60) Provisional application No. 60/176,580, filed on Jan. 18, 2000.

(51) Int. Cl.
  *G06F 15/30* (2006.01)
(52) U.S. Cl. .......................... 705/38; 705/39
(58) Field of Classification Search ................. 705/40, 705/38–39
  See application file for complete search history.

(56) References Cited

U.S. PATENT DOCUMENTS

| | | | |
|---|---|---|---|
| 3,971,916 A | 7/1976 | Moreno | 235/61.7 B |
| 4,001,550 A | 1/1977 | Schatz | 235/61.7 B |
| 4,007,355 A | 2/1977 | Moreno | 235/61.7 R |
| 4,798,403 A | 1/1989 | Nelson | 283/70 |
| 4,977,595 A | 12/1990 | Ohta et al. | 380/24 |
| 5,477,038 A | 12/1995 | Levine et al. | 235/380 |
| 5,511,121 A | 4/1996 | Yacobi | 380/24 |
| 5,768,385 A | 6/1998 | Simon | 380/24 |
| 5,770,843 A | 6/1998 | Rose et al. | 235/380 |
| 5,799,087 A | 8/1998 | Rosen | 380/24 |
| 5,864,830 A | 1/1999 | Armetta et al. | 705/41 |
| 5,884,290 A | 3/1999 | Smorodinsky et al. | 705/44 |
| 5,901,229 A | 5/1999 | Fujisaki et al. | 380/30 |
| 5,923,734 A | 7/1999 | Taskett | 379/88.25 |
| 5,924,084 A | 7/1999 | De Rooij | 705/39 |
| 5,926,548 A | 7/1999 | Okamoto | 380/24 |
| 5,983,207 A | 11/1999 | Turk et al. | 705/39 |
| 6,145,741 A * | 11/2000 | Wisdom et al. | 235/380 |

OTHER PUBLICATIONS

Issuers Try To Lure Teens with Prepaid Cards, American Banker, Oct. 2000.*
US 5,899,862, 03/1999, Ohta et al. (withdrawn).

* cited by examiner

*Primary Examiner*—Richard Weisberger
(74) *Attorney, Agent, or Firm*—Ernest D. Buff & Associates, LLC; Ernest D. Buff; Margaret A. LaCroix

(57) ABSTRACT

An anonymous credit card has a unique identification number and a card value, which is exhausted when the cash amount of the card is expended. The card is sold by a first vendor and accepted by a second vendor when presented by the user. It is managed by an issuing institution, which verifies the presence of sufficient funds to cover the cost charged and deducts the charge cost from the card value. The card has a limited monetary value, which is advantageous if it is lost or stolen. No connection exists between the card and its owner. As a result, the owner's credit rating cannot be tarnished by actions of a third party.

10 Claims, 2 Drawing Sheets

ANONYMOUS CREDIT CARD

CROSS-REFERENCE TO RELATED APPLICATIONS

This application claims the benefit of provisional application Ser. No. 60/176,580, filed Jan. 18, 2000.

BACKGROUND OF THE INVENTION

1. Field of the Invention

The present invention relates to electronic monetary systems used to process the electronic equivalent of cash or other currency; and more particularly, to an anonymous credit card purchasing system and method.

2. Description of the Prior Art

Various credit card systems are described in the prior art. U.S. Pat. No. 5,511,121 to Yacobi discloses an electronic cash system that protects the privacy of users in legitimate transactions while at the same time enabling the detection of a double spender of the same electronic coin. The electronic cash system takes advantage of a unique property of El Gamal signatures to achieve these results. This system requires the user to use electronic money modules, and requires a processor that makes it a complicated and costly system.

U.S. Pat. No. 5,924,084 to De Rooij relates to a method for tracing payment data in an anonymous payment system having electronic payment means, such as so-called "smart cards". According to the invention, the user commits himself to a value, which may later be used for the tracing by a payment institution. The value is preferably recorded with the help of a so-called one-way function and an electronic signature, so that the payment institution does not dispose of the value itself, but is able to verify it on the basis of the stored derivative of the value. The invention further relates to a payment means and a payment system for application of the method. This system requires the user to use a smart card having a processor, resulting in a complicated and costly system.

U.S. Pat. No. 3,971,916 to Moreno relates to a data-transfer system. Data, for example, relating to a bank account, is carried on the person in the form of a small portable means such as a flat card containing encapsulated logic microstructures. The circuitry includes a memory and its control circuits, with inhibitor means preventing access to predetermined sections of the memory. This system, like that of De Rooij, requires the presence of a smart card having a processor, making it complicated and costly.

U.S. Pat. No. 5,864,830 to Armetta, et al. discloses a data-processing method by which one or more prepaid satellite spending cards are configured and linked to a cardholder's host credit card or card account such that a predetermined available spending capacity of each satellite card is selectively determined by the cardholder of the host credit card. The prepaid amount is deducted from the available balance of the host card or card account and limits the total spending capacity of the satellite card. The main cardholder may also remotely selectively increase the available spending capacity of the one or more satellite cards by deducting the desired additional spending capacity of each satellite card from the available balance of the host credit card as a purchase against the host card account. Although this method does not require a smart card, it necessitates use of a host credit card. Accordingly, it cannot guarantee anonymity of the user.

There remains a need in the art for a simple anonymous credit card system. Such a system, if provided, would be especially suited for purchasing gifts, drugs, services such as pregnancy tests and items having adult oriented content.

SUMMARY OF THE INVENTION

The invention provides an electronic monetary system in which an anonymous credit card has a unique identification number, which is exhausted when the prepaid cash amount of the card is expended. Operation of the card is somewhat similar to that of a phone card. It is managed by the issuing institution and verification is made by the institution.

Generally stated, there is provided a system for purchasing goods or services comprising: a plurality of prepaid credit cards each having a unique identification number and a monetary value printed on its face; a storage means for storing the identification numbers and the monetary value for each of a plurality of credit cards; a computing means approving or disapproving a sale; and a communication means for transmitting to and receiving from the computing means the identification number and the cost of the goods or services, whereby a customer is provided with means for anonymously purchasing the goods or services.

Further, the invention provides a method of payment for goods or services comprising the steps of: purchasing a prepaid credit card of a predetermined value from a first vendor, the credit card having a unique identification number and having been issued by an issuing institution; presenting the prepaid credit card to a second vendor for payment of a charge cost comprised of the price of goods or services being purchased; transmitting the identification number and the charge cost to the issuing institution; deducting the charge cost from the predetermined value, if the predetermined value equals or exceeds the charge cost; transmitting sale approval to the second vendor, if the predetermined value equals or exceeds the charge cost; and transmitting sale disapproval to the second vendor, if the predetermined value does not equal or exceed the charge cost, whereby the customer is provided with a method for anonymously purchasing the goods or services. Generally, the identification number is embossed on the credit card. Alternatively, the identification number is encoded in a magnetic strip on the credit card.

In another embodiment, the invention provides for a method of payment for goods or services, comprising the steps of: issuing a plurality of prepaid credit cards of various predetermined values, the credit cards each having a unique identification number and being issued by an issuing institution; recording the identification number of each credit card with a corresponding predetermined value; distributing the credit cards to a plurality of first vendors; selling the credit cards at the predetermined value, said selling being to customers by the first vendors; purchasing a prepaid credit card having a predetermined value, said purchase being made from one of the first vendors by one of the customers; paying the issuing institution the predetermined value minus a sales commission; presenting the prepaid credit card to a second vendor for payment of a charge cost comprised of a price for goods or services; transmitting the identification number and the charge cost to the issuing institution, the transmitting being made by the second vendor; deducting the charge cost from the predetermined value, if the predetermined value equals or exceeds the charge cost; transmitting sale approval to the second vendor, if the predetermined value equals or exceeds the charge cost; transmitting sale disapproval to the second vendor, if the predetermined value does not equal or exceed the charge cost; and paying the issuing institution a commission on the sale, whereby the customer is provided with a method for anonymously purchasing the goods or services.

Using a process somewhat similar to that of phone cards, wherein the user prepays certain buying power appointed for use on a telephone, the system of the present invention provides a modified credit card, having a pre-defined value appointed for purchase of goods and services. The anonymous credit card is presented as a credit card. Although a particular format is not required, it is preferably packaged in shrink-wrap packaging to avoid liability prior to opening. Each card comes with a face value, as for example: U.S. $20, $50, $100. Other monetary units, such as the Euro, may optionally be used.

Sale of the anonymous credit card may be effected at newspaper stands, banks, grocery shops, department stores and/or any consumer outlet. Each transaction is deducted from its initial face value up to exhaustion of the card. Upon exhaustion, the card has no further value, and is disposed of. The card is invoiced, monitored and charged by an issuing institution, such as a bank.

The anonymous credit card guarantees privacy for the user. There is no connection between the cardholder and the card itself. A cash payment is preferably used when acquiring a card, thereby totally eliminating any connection to the user's identity. A major advantage of the present invention over standard credit cards is the limited value of the card if it is lost or stolen. Yet another advantage resides in the absence of any connection between the card and its owner. This prevents the owner's credit rating from being tarnished by actions of a third party. The importance of these advantages has been underscored by the rash of recent news stories concerning theft of credit card numbers from on-line vendors.

BRIEF DESCRIPTION OF THE DRAWINGS

The invention will be more fully understood and further advantages will become apparent when reference is had to the following detailed description and the accompanying drawings, wherein like reference numerals denote similar elements throughout the several views and in which.

DESCRIPTION OF THE PREFERRED EMBODIMENTS

Figure 1:
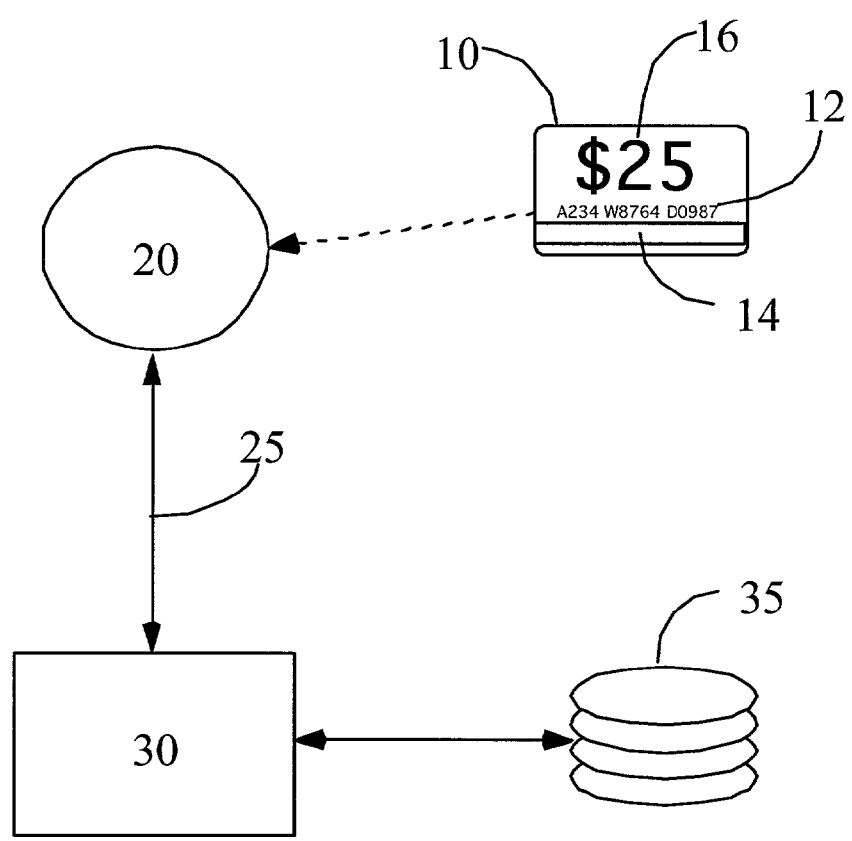
FIG. 1 is a block diagram of the system of the present invention.
Figure 2:
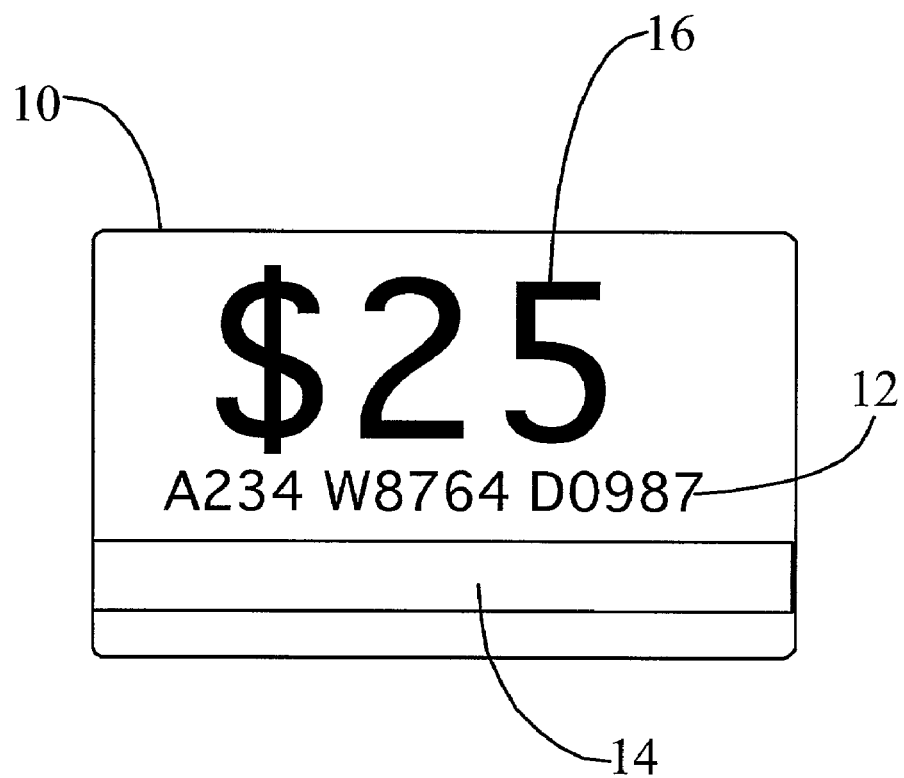
FIG. 2 is a top plan view depicting the front face of a prepaid credit card suited for use in the system of FIG. 1.

Referring to FIGS. 1 and 2 of the drawings, there is shown a system for purchasing goods or services, comprising: a plurality of prepaid credit cards 10 each having a unique identification number 12 and a monetary value 16 printed on its face. A storage means 35 stores the identification numbers 12 and the monetary value 16 for each of a plurality of prepaid credit cards. A computing means 30 approves or disapproves a sale in which credit card 10 is used. A communication means 25 transmits and receives between the computing means 30 and vendor 20 an identification number and a charge cost comprised of the price of goods or services to be purchased. The charge cost and the identification number are sent to the computing means 30, whereby a customer is provided with a means for anonymously purchasing the goods or services. Alternatively, the identification number 12 is embossed on the credit card. As a further alternative, the identification number is encoded in a magnetic strip 14 on the prepaid credit card 10. Communication means 25 is implemented as a telephone connection or like data transmission means. Storage means 35 comprises a standard magnetic or optical disk drive or the like. Computing means 30 comprises a general purpose or stand-alone computer.

In practice, the anonymous credit card is presented as a credit card. Although a particular format is not required, it is preferably packaged in shrink-wrap packaging to avoid unauthorized use prior to opening. Each card has a face value, as for example: U.S. $20, $50, $100. Other monetary units, such as the Euro may optionally be used. Sale of the anonymous credit card is effected at newspaper stands, banks, grocery shops, department stores and/or any consumer outlet. Each transaction is deducted by computing means 30 from its value stored in storage means 35 until the face value of the card has been exhausted. After being exhausted, the card has no further value and is readily disposed of.

The invention further provides a method of payment for goods or services comprising the steps of: purchasing a prepaid credit card containing a predetermined value from a first vendor, the credit card having a unique identification number and having been issued by an issuing institution; presenting the prepaid credit card to a second vendor for payment of a charge cost comprised of the price of goods or services; transmitting the identification number and the charge cost to the issuing institution; deducting the charge cost from the predetermined value, if the predetermined value equals or exceeds the charge cost; transmitting sale approval to the second vendor, if the predetermined value equals or exceeds the charge cost; and transmitting sale disapproval to the second vendor, if the predetermined value does not equal or exceeds the charge cost, whereby the customer using said prepaid credit card is enabled to purchase the goods or services anonymously.

Still further, the invention provides a method of payment for goods or services comprising the steps of: issuing a plurality of prepaid credit cards of various predetermined values, the credit cards each having a unique identification number and being issued by an issuing institution; recording the identification number of each credit card with corresponding predetermined value; distributing the credit cards to a plurality of first vendors; selling the credit cards at the predetermined value to customers, the selling being effected by the first vendors; purchasing a prepaid credit card of a predetermined value from one of the first vendors; paying the issuing institution the predetermined value minus a sales commission; presenting the prepaid credit card to a second vendor for payment of cost of the goods or services; transmitting the identification number and the cost to the issuing institution, the transmitting being effected by the second vendor; deducting the cost from the predetermined value, if the predetermined value equals or exceeds the cost; transmitting sale approval to the second vendor, if the predetermined value equals or exceeds the cost; transmitting sale disapproval to the second vendor, if the predetermined value does not equal or exceed the cost; and paying the issuing institution a commission on the sale, whereby the customer using said prepaid credit card is provided with a method for anonymous purchase of the goods or services. In this manner, the credit card account is managed by the issuing institution, such as a bank, and verification is made by the institution. The first vendor profits from the sale of the prepaid credit card, and the second vendor pays a fee to the issuing institution for accepting the card for payment of the goods or services sold.

Presenting the credit card, as described above, includes at least one of the following: (i) physically showing the card or a reasonable facsimile thereof; (ii) verbally giving the identification number over the phone; (iii) typing the identification number into a touch-tone phone; or (iv) typing the identification number into a computer for transmission via the Internet and/or a telephone network.

Alternatively, some digits of identification number 12 are reserved for specific purposes. For example, the first digit of identification number 12 is used as a mark of adult status: numbers starting with one signify the cardholder is 18 years of age or older. Buying such a card would require proper ID from the buyer at the time of purchase only, and would be done for age related purchases such as those involving tobacco, alcohol or adult oriented content. Cards of this type are marked to exhibit a card buyer status selected from the group consisting of minor and adult.

Having thus described the invention in rather full detail, it will be understood that such detail need not be strictly adhered to, but that various changes and modifications may suggest themselves to one skilled in the art, all falling within the scope of the invention, as defined by the subjoined claims.

I claim:

1. A system for purchasing goods or services from a vendor, comprising:
   a) a plurality of prepaid credit cards each having a unique identification number and a monetary value printed on its face;
   b) storage means for storing said identification numbers and said monetary value for each of a plurality of prepaid credit cards;
   c) computing means for approving or disapproving a sale;
   d) communication means for transmitting and receiving between said computing means and said vendor said identification number and a charge cost, said charge cost being comprised of a price for said goods or services; and
   e) said identification number further including a mark indicating card buyer status, said card buyer status being selected from the group consisting of minor and adult;
   whereby a customer using said prepaid credit card is enabled to anonymously purchase said goods or services.

2. A system as recited by claim 1, wherein said identification number is embossed on said credit card.

3. A system as recited by claim 1, wherein said identification number is encoded in a magnetic strip on said credit card.

4. A method of payment for goods or services, comprising the steps of:
   a) purchasing a prepaid credit card of a predetermined value from a first vendor, said credit card having a unique identification number and having been issued by an issuing institution;
   b) issuing an identification number that includes a mark indicating card buyer status, said card buyer status being selected from the group consisting of minor and adult;
   c) presenting said prepaid credit card to a second vendor for payment of a charge cost composed of a price for said goods or services;
   d) transmitting said identification number and said charge cost to said issuing institution;
   e) deducting said charge cost from said predetermined value, if said predetermined value equals or exceeds said charge cost;
   f) transmitting sale approval to said second vendor, if said predetermined value equals or exceeds said charge cost; and
   g) transmitting sale disapproval to said second vendor, if said predetermined value does not equal or exceeds said charge cost,
   whereby a customer is able to anonymously purchase said goods or services.

5. A method as recited by claim 4, wherein said identification number is embossed on said credit card.

6. A method as recited by claim 4, wherein said identification number is encoded in a magnetic strip on said credit card.

7. A method of payment for goods or services, comprising the steps of:
   a) issuing a plurality of prepaid credit cards of various predetermined values, said credit cards each having a unique identification number and being issued by an issuing institution, said unique identification number further including a mark indicating card buyer status, said card buyer status being selected from the group consisting of minor and adult;
   b) recording said identification number of each credit card with a corresponding predetermined value;
   c) distributing said credit cards to a plurality of first vendors;
   d) selling said credit cards at said predetermined value to customers, said selling being effected by said first vendors;
   e) purchasing a prepaid credit card of a predetermined value from one of said first vendors, said purchasing being effected by said customer;
   f) paying said issuing institution said predetermined value minus a sales commission;
   g) presenting said prepaid credit card to a second vendor for payment of a charge cost comprised of a price for said goods or services;
   h) transmitting said identification number and said charge cost to said issuing institution, the transmitting being effected by said second vendor;
   i) deducting said charge cost from said predetermined value, if said predetermined value equals or exceeds said charge cost;
   j) transmitting sale approval to said second vendor, if said predetermined value equals or exceeds said charge cost;
   k) transmitting sale disapproval to said second vendor, if said predetermined value does not equal or exceeds said charge cost; and
   l) paying said issuing institution a commission on said sale,
   whereby a customer using said prepaid credit card is enabled to anonymously purchase said goods or services.

8. A system as recited by claim 1, wherein said monetary value printed on said face of each of said credit cards is non-renewable and cannot be renewed after said monetary value is exhausted.

9. A system as recited by claim 1, wherein each of said plurality of prepaid credit cards is packaged in a sealed shrink-wrap packaging prior to opening.

10. A system as recited by claim 1, wherein said monetary value of each of said plurality of prepaid credit cards is not more than an amount of one hundred dollars.

* * * * *